United States Patent [19]

Brumfield, Jr. et al.

[11] 4,261,189
[45] Apr. 14, 1981

[54] PANELBOARD VENT ASSEMBLY

[75] Inventors: Walter T. Brumfield, Jr., Nicholasville; Norman M. Newsome; Harris I. Stanback, both of Lexington, all of Ky.

[73] Assignee: Square D Company, Palatine, Ill.

[21] Appl. No.: 5,053

[22] Filed: Jan. 22, 1979

[51] Int. Cl.³ .................... E05B 59/04; E05B 63/00; E05C 17/02; H02B 1/08

[52] U.S. Cl. .................................. 70/84; 49/141; 49/394; 70/93; 70/94; 70/489; 174/66; 200/306; 292/5; 292/8; 292/56; 292/99; 292/338; 292/341.17; 292/DIG. 65

[58] Field of Search ................ 200/306; 361/356; 49/141, 394; 174/66; 70/84, 82, 81, 145, 144, 142, 141, 93, 94, 489; 292/5, 8, 56, 99, DIG. 65, 341.17, 338

[56] References Cited

U.S. PATENT DOCUMENTS

| 753,642 | 3/1904 | Sliga | 292/99 X |
|---|---|---|---|
| 926,321 | 6/1909 | Dominik | 70/93 X |
| 2,106,003 | 1/1938 | Hewitt | 361/356 X |
| 2,197,648 | 4/1940 | Mersheimer | 292/8 X |
| 2,256,465 | 9/1941 | Brubaker | 292/99 X |
| 2,622,429 | 12/1952 | Lipiner | 70/93 |
| 2,741,505 | 4/1956 | Courney | 292/341.17 |
| 3,046,615 | 7/1962 | Sherron | 49/394 X |
| 3,402,579 | 9/1968 | Hallgren | 70/489 |
| 3,690,708 | 9/1972 | Worley et al. | 292/DIG. 65 |
| 4,131,932 | 12/1978 | Brumfield, Jr. et al. | 361/356 |

FOREIGN PATENT DOCUMENTS

| 577077 | 12/1933 | Fed. Rep. of Germany | 292/341.17 |
|---|---|---|---|
| 821057 | 11/1951 | Fed. Rep. of Germany | 174/66 |
| 1405441 | 5/1965 | France | 174/66 |
| 10819 | of 1913 | United Kingdom | 292/5 |
| 506874 | 6/1939 | United Kingdom | 292/338 |
| 750585 | 6/1956 | United Kingdom | 70/93 |

Primary Examiner—Richard E. Moore
Assistant Examiner—Carl F. Pietruszka
Attorney, Agent, or Firm—Norton Lesser; Larry I. Golden; Richard T. Guttman

[57] ABSTRACT

A retainer plate is pivotally mounted on a panelboard cabinet door lock housing, which carries a latch for locking the door. A detent on the plate engages in a rabbet opening to enable limited opening movement of the door in response to the pressure developed by arc gases generated by fault currents passing through a tripped circuit breaker in the panelboard cabinet. For ordinary opening movement, the lock latch is manually operated to pivot the retainer plate and disengage the detent from the rabbet opening.

10 Claims, 13 Drawing Figures

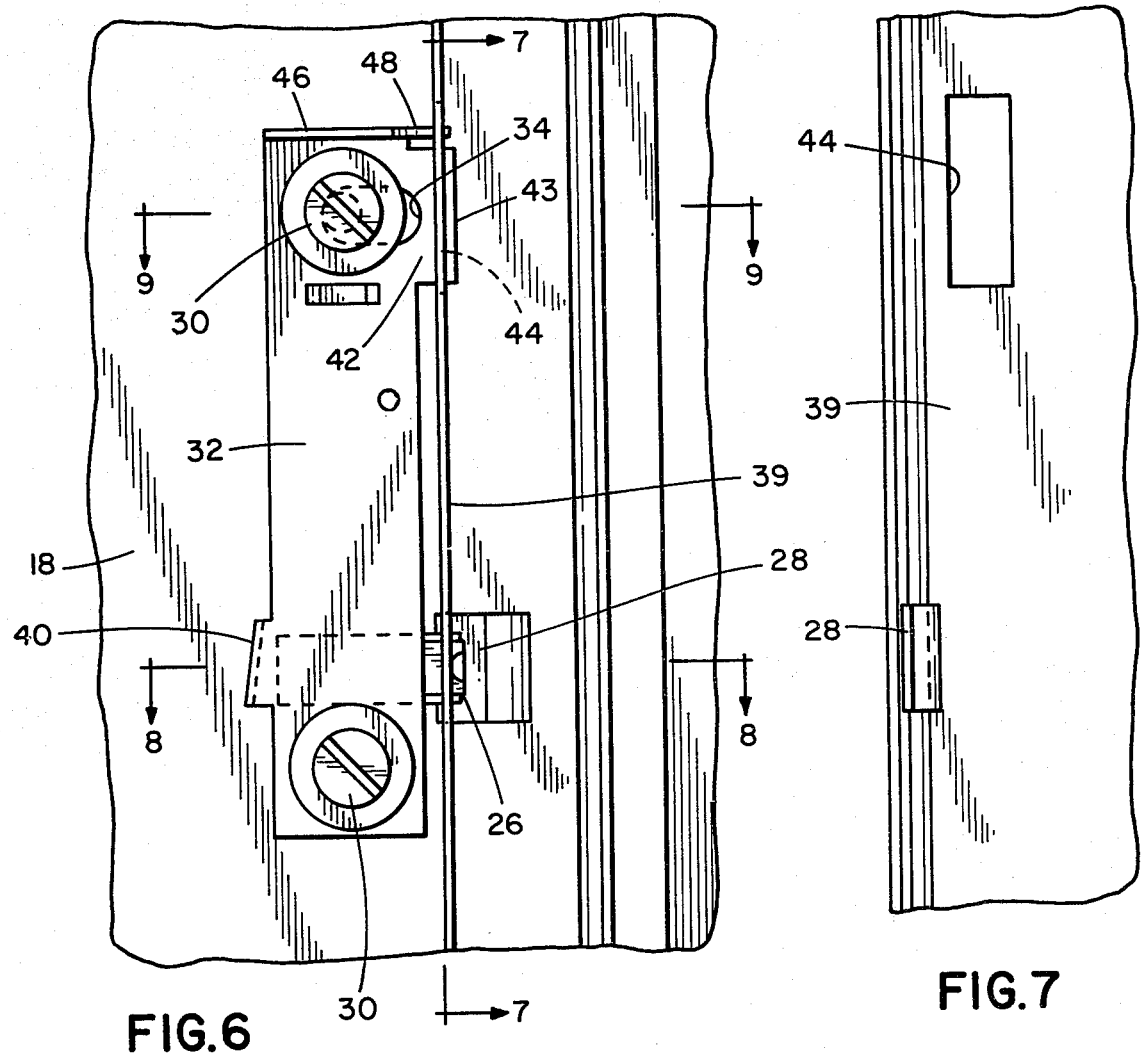
FIG.6
FIG.7
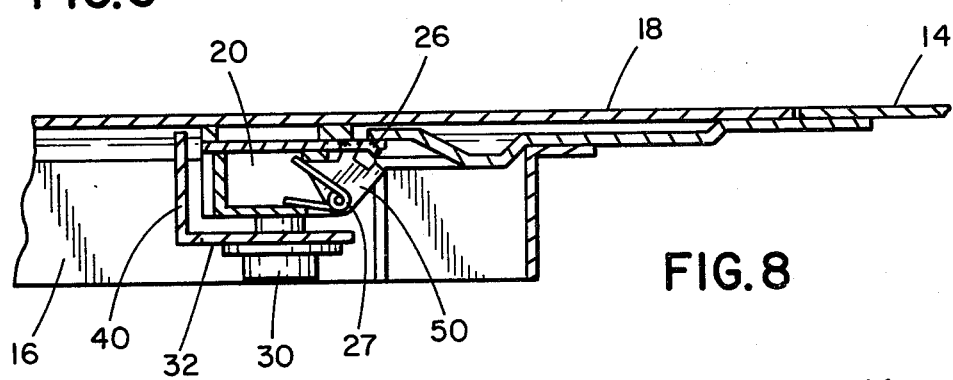
FIG.8
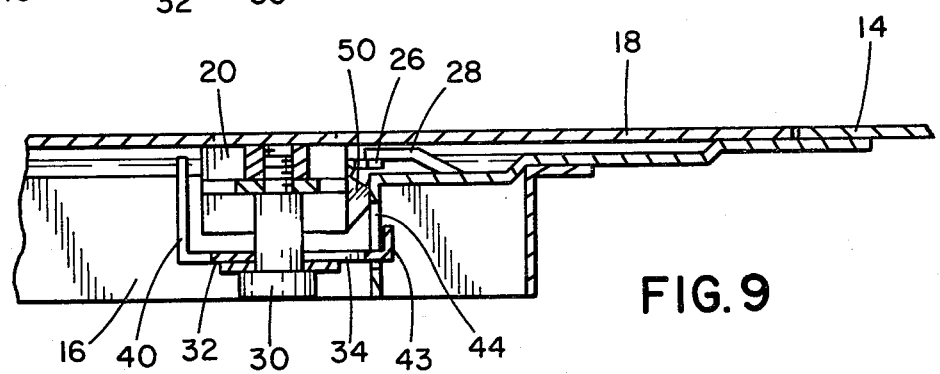
FIG.9

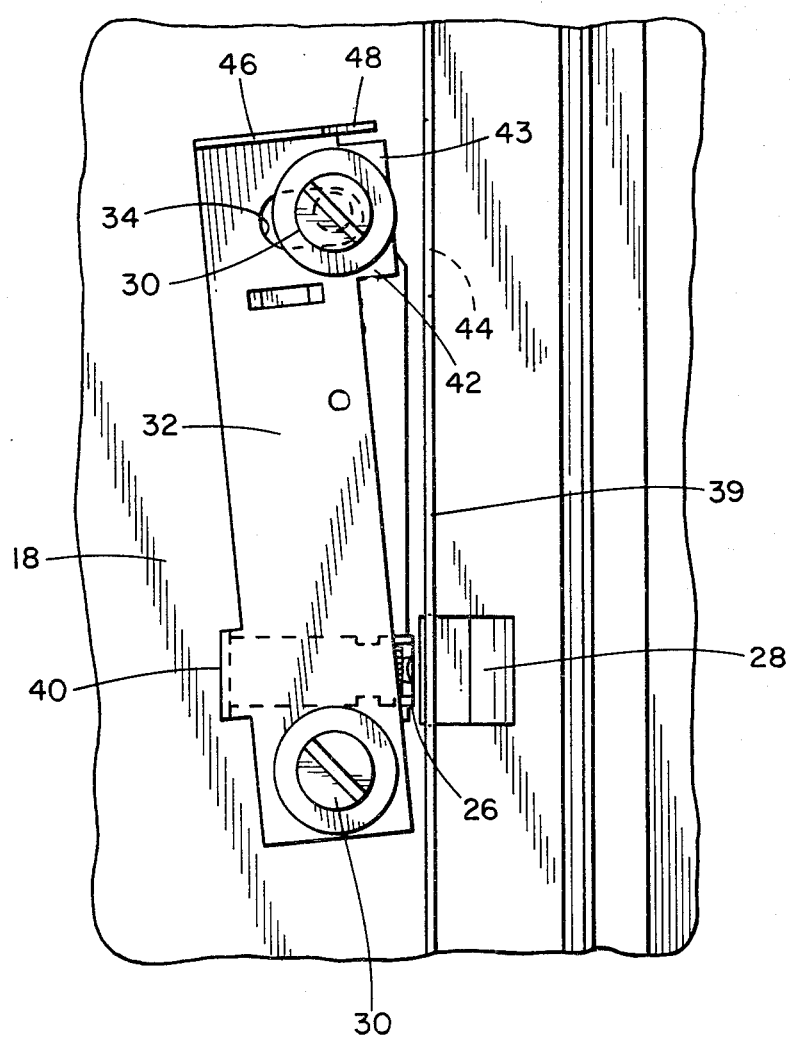
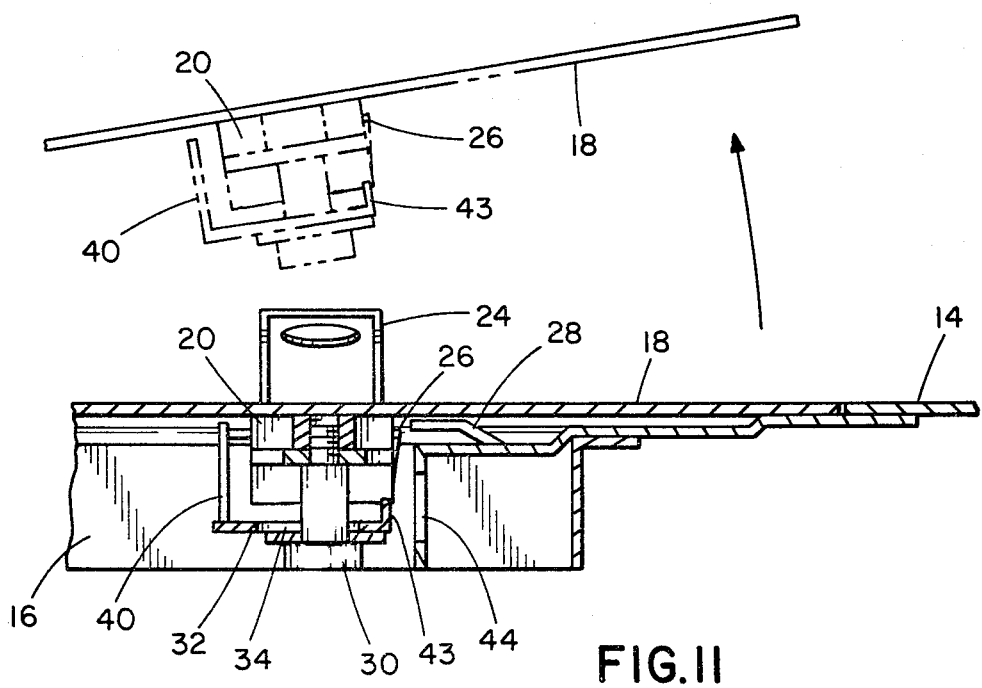
FIG. 10
FIG. 11

PANELBOARD VENT ASSEMBLY

FIELD OF THE INVENTION

The present invention relates in general to locked enclosures subject to internal gas pressure and more particularly to an improved panelboard vent assembly.

SUMMARY OF THE PRIOR ART

Panelboard assemblies incorporate a cabinet, which houses a plurality of circuit breakers each connected to a respective bus bar. The circuit breakers are disposed behind an interior trim and for access their handles project through the interior trim.

The front of the cabinet including the interior trim is overlapped by an exterior trim or cover. The cover is provided with a door, which is opened to provide access to the circuit breaker handles. The door carries a lock assembly, which may be of the type shown in U.S. Pat. No. 3,402,579 and when the door is closed and locked prevents access by unauthorized persons.

The lock assembly incorporates a latch, which is received behind a tang or keeper formed in the door frame to retain the door closed. The tripping of one of the circuit breakers under short circuit fault conditions creates large pressures which are applied against the locked door to open the door since the keeper can yield relatively easily to the pressure. The door may thus blow open with considerable force and injure nearby personnel, while the sudden release of a large volume of hot ionized gas creates a hazard.

In view of this situation regulatory and/or testing agencies have instituted a requirement that the panelboard doors open no more than 60°, when subject to the gas pressure occuring from tripping of an enclosed circuit breaker by short circuit fault currents. Holding a panelboard door closed under short circuit fault current conditions can of course result in the warpage and bending of the door and/or associated metal parts.

SUMMARY OF THE INVENTION

To solve the problem of holding a door from opening fully, when subject to arc gases generates by short circuit fault currents, the present invention employs a retainer plate pivotally carried on the lock assembly to permit a slight opening of the door for the purpose of venting the arc gases.

On closure of the door, the retainer plate and the latch element of the lock are both pivoted to respectively move into alignment with a passage in the door frame and past the latch keeper. A bias spring on the retainer plate then pivots the plate back to normal to engage a detent on the retainer plate in the frame passage, while the lock latch simply engages behind its keeper.

With the detent of the retainer plate engaged in the frame passage, limited movement of the door is permitted, if the latch keeper gives, since the frame passage is somewhat larger than the detent.

On the generation of arc gases, pressure against the door may cause the keeper to bend and allow movement of the door, but the detent then engages the transverse edge on the frame to allow a slight opening of the door for venting the gases. A lip on the detent also engages behind the frame edge, which provides a rigid stable stop, and the lip prevents the detent from slipping past the edge.

Thus limited opening movement of the door is permitted to vent the gases but full opening is prevented.

For normal opening of the door the lock handle is simply pivoted to withdraw the latch from behind the keeper and the latch plate moves the retainer plate to disengage the retainer detent from the frame passage. The door may then be simply pulled open.

Accordingly it is one object of the present invention to provide an improved vent assembly for the enclosure of a circuit interrupting device.

It is another object to provide an improved latch assembly for use in venting a panelboard.

Other objects and features of the present invention will become apparent on examination of the following specification including the claims and accompanying drawings.

BRIEF DESCRIPTION OF THE DRAWINGS

FIG. 6 is a fragmentary view of the door and frame from the inside of the enclosure showing the door in locked condition.

FIG. 7 is a sectional taken along the line 7—7 in FIG. 6 and looking in the direction of the arrows.

FIG. 8 is a sectional taken along the line 8—8 in FIG. 6.

FIG. 9 is a sectional taken along the line 9—9 in FIG. 6.

FIG. 10 is a fragmentary view of the door and frame showing the lock and retainer partially disengaged position.

FIG. 11 is a fragmentary view showing the door in partially open position.

DESCRIPTION OF THE PREFERRED EMBODIMENT

Figure 1:
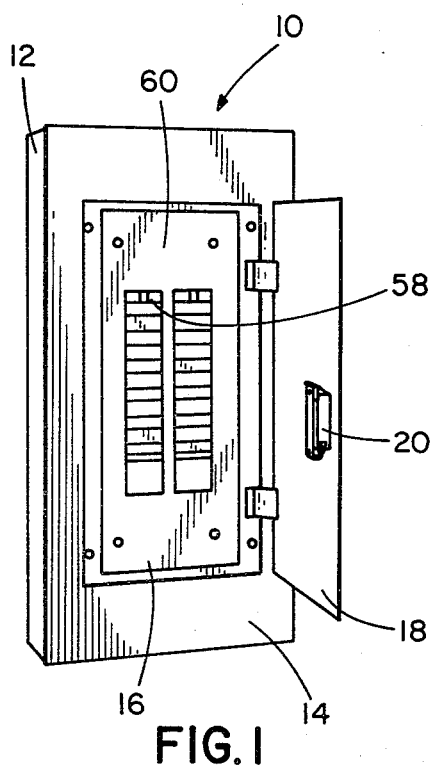
FIG. 1 is an isometric view of a panelboard incorporating the principles of the present invention.

In FIG. 1 of the drawings a panelboard assembly is indicated by the reference character 10. The panelboard assembly 10 comprises a cabinet 12 having a trim plate or cover 14 with a frame defining an opening 16 adapted to be closed by a door 18 hingedly mounted on the cover 14 for movement to a closed position and to an open position.

Figure 3:
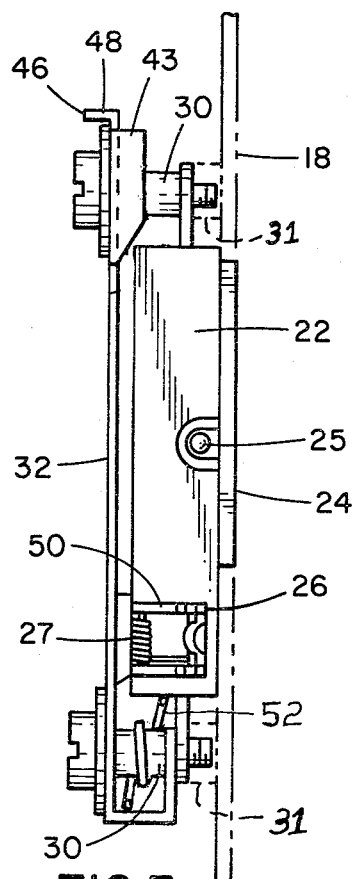
FIG. 3 is a side elevational view of the lock assembly shown in FIGS. 1 and 2.

The door 18 carries a latch assembly 20 of the type mentioned or described in the aforementioned U.S. Pat. No. 3,402,579. The latch assembly 20 includes box like housing 22 carrying a handle 24 pivoted about the axis of pin 25 for controlling a latch or latch element 26 biased by a torsion spring 27 best seen in FIGS. 3 and 8. Latch element 26 is adapted to be translated in a plane parallel to the handle pivot pin 25 to enable one end of latch 26 to be received behind a keeper 28 as best seen in FIGS. 6 and 9, when the door is closed. The keeper 28 is formed as a flat forwardly projecting tang on one portion of the door frame extending parallel to the door in the closed position.

The housing 22 of the latch assembly 20 has a pair of ears at opposite ends mounted on the rear surface of door 18 by means of a pair of spaced shouldered studs or posts 30 having threaded ends received by nuts 31 secured to the door. A retainer or retainer plate 32 having a pair of spaced passages 34 and 36 each receiving a respective post 30 is located behind the door 18 and the latch housing 22.

The passage 36 pivotally receive the corresponding post 30 and a U-shaped bend at the corresponding end of plate 32 abuts one of the housing ears and has an aligned semi-circular passage 38 engaging the respective post so that passages 36 and 38 provide spaced bearing or journal areas.

Passage 34 of plate 32 comprises a slot receiving the respective post 30 to enable limited pivotable movement of the retainer plate 32 about the axis of passages 36 and 38 toward and from a rabbet 39 on the cover 14 and forming a transverse portion of the door frame forming opening 16 as best seen in FIGS. 6–11.

Figure 2:
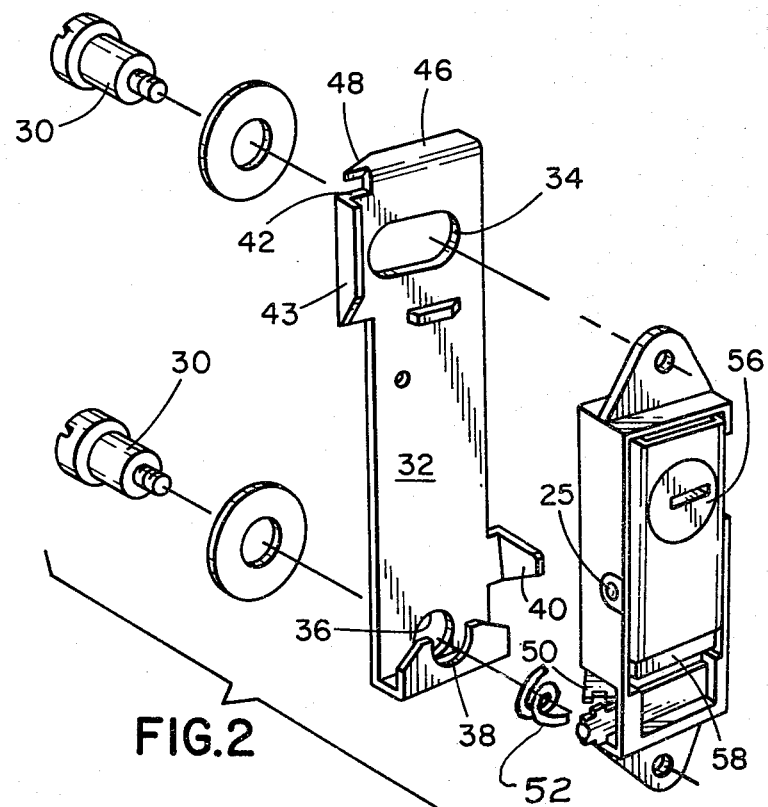
FIG. 2 is an exploded isometric view of the lock assembly incorporating the principles of the present invention.
Figure 4:
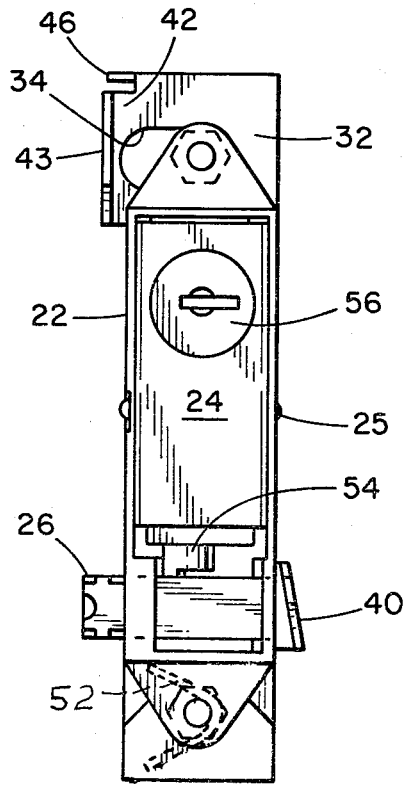
FIG. 4 is a front elevational view of the lock assembly shown in FIGS. 1 and 2.
Figure 5:
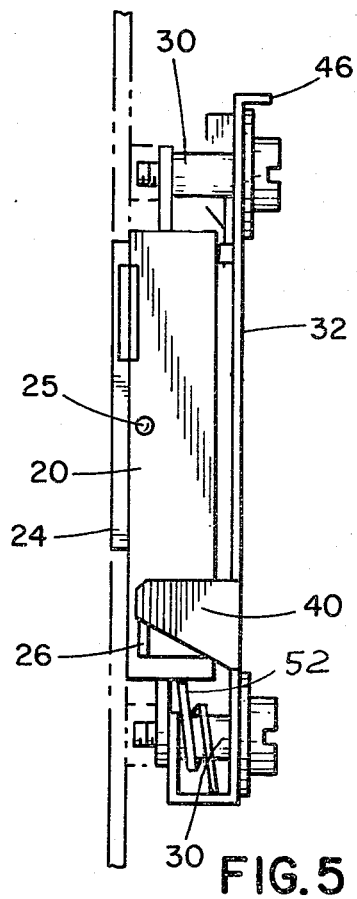
FIG. 5 is a side elevational view of the lock assembly shown in FIGS. 1 and 2.
Figure 12:
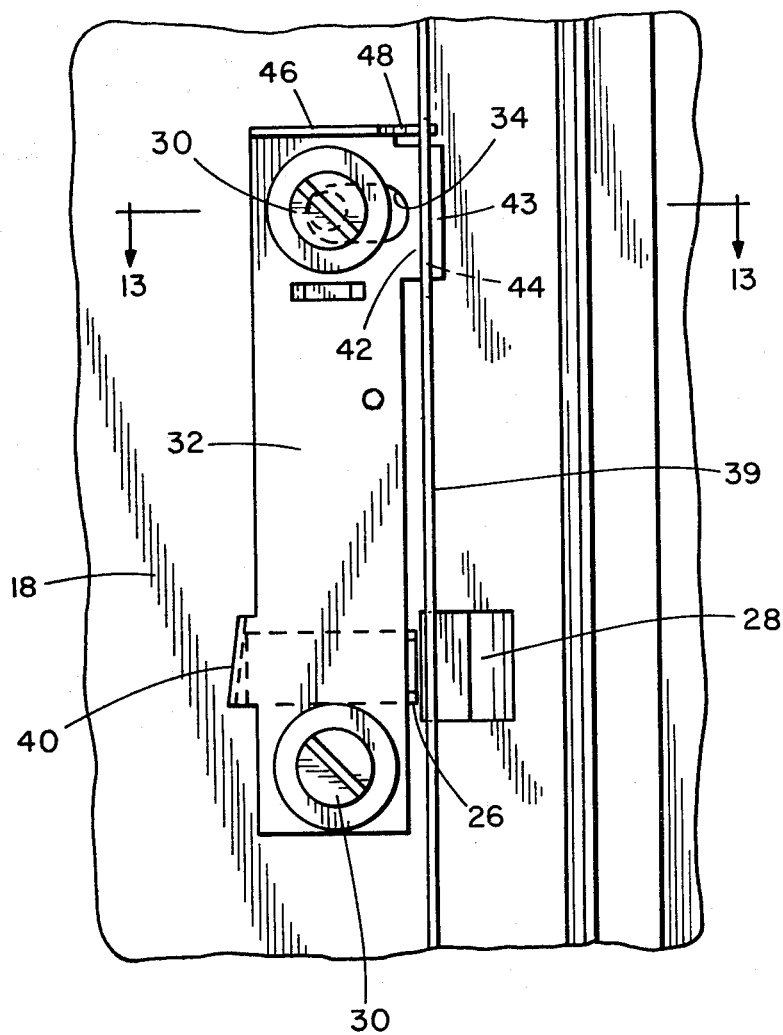
FIG. 12 is a fragmentary view of the door and frame illustrating the latch and retainer plates disengaged from the frame to permit gas venting.
Figure 13:
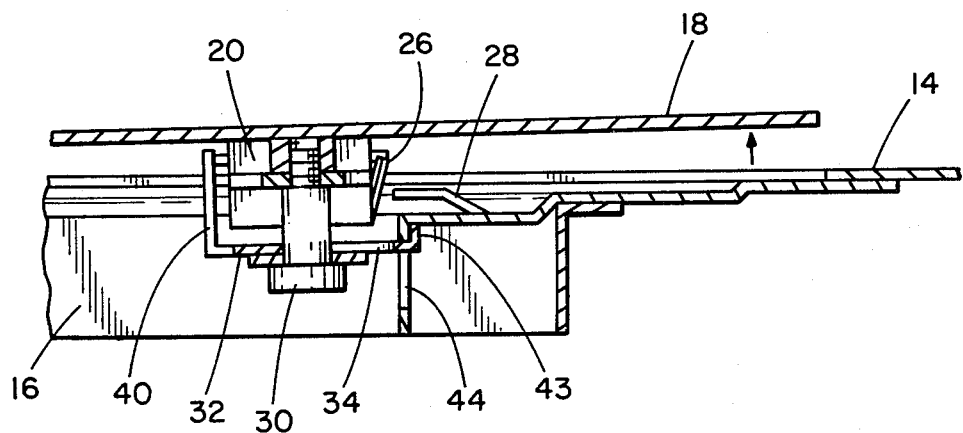
FIG. 13 is a sectional view taken along the lines 13—13 in FIG. 12 illustrating the door partially open to vent arc gases.

An arm 40 is formed along one edge of plate 32 in alignment with latch 26 for engagement by the latch 26, when the latch element is withdrawn from the keeper 28 to pivot the plate 32 clockwise, as viewed in FIGS. 2 and 4.

The opposite edge of plate 32 is provided with an L shaped detent 42. The detent 42 projects toward the door edge with one leg of the detent extending in the direction of housing 22 to form a lip 43, generally aligned with the one end of latch 26 engaging keeper 28 and displaced upwardly therefrom. The L-shaped detent 42 is adapted to be received in an opening or passage 44 of the door frame or rabbet 39 so as to be located behind a transverse edge of the rabbet when the door 18 is closed as best seen from FIGS. 6, 7 and 9.

A cam 46 is also formed on the upper edge of plate 32. Element 46 is provided with a cam surface 48 terminating in the plane of the lip 43 and generally aligned with a cam surface of a toothed member 50 in the lock assembly 20, best spaced forwardly thereof. Cam surface 48 engages the door frame for opening 16 and pivots the retainer plate from the opening or frame edge on closing movement of the door.

The retainer plate 32 is biased toward the frame edge by a spiral or torsion spring 52 wrapped about the lower post 30 with one end of the spring engaged by the retainer plate 32 and the other end of the spring engaged with the lock housing 22. The plate 32 is thus normally biased into parallel alignment with the housing as the upper post 30 engages one edge of slot 34 to form one limit position for the plate 32. The detent 42 is then generally aligned with one end of the latch 26 under the bias of the respective springs 52 and 27.

To close the door 18, the door is simply pivoted toward a closing position and the cam surface 48 of cam 46 engages the door frame to pivot the retainer plate 32 from the frame against the bias of spring 52. Thereafter the cam surface of toothed element 50 engages the frame and it translates the latch 26 to the right as seen in FIGS. 2 and 4. Alternatively handle 24 is pivoted clockwise, as viewed in FIGS. 2 and 3, about the axis of pin 25 to pivot a cam 54, which pivots toothed member 50 to engage teeth along the top surface of latch 26. Latch 26 moves to the right as seen in 2 and 4 to engage arm 40 of plate 32 and pivot the plate clockwise as seen in FIGS. 2 and 4 so that latch 26 and lip 43 clear the door frame.

When the detent 42 and cam surface 48 are aligned with opening 44 in rabbet 39 the pressure on plate 42 is relieved either by release of handle 24 or by the position of latch 26 behind keeper 28, and the spring 52 pivots the plate 32 to engage detent 42 in the opening 44 behind a transverse edge of the rabbet 39. As the cam surface on element 50 and latch 26 have moved past the keeper 28, the pressure applied against the bias of spring 27 is relieved and the spring 27 moves the latch element 26 behind the keeper, whereafter the lock assembly may be key locked in position at the key cylinder 56.

If a circuit breaker indicated at 58, one or more of which are normally located behind the interior trim indicated generally at 60 in FIG. 1, should trip in response to a fault current, the arc gasses may generate considerable pressure against the door 18. The keeper 28, which is generally a simple flat tang formed from the outwardly facing surface of the rabbet may easily bend in response to the pressure applied against door 18 to release the latch 26. However the detent 42 being located behind an edge of rabbet 39 whose major cross sectional dimension is transverse to the opening direction of movement engages that relatively rigid edge, after the door moves or pivots a short distance about its hinges so that the door is held from further opening movement. Thus in the opening movement of the door, it may separate substantially 0.25" from the frame, as the passage 44 is larger than the detent 42 to provide a sufficiently large passage to vent the gases without creating a hazard for nearby personnel, since far less than a 60 degree movement is permitted. The projecting portion or lip 43 of detent 42 engaging behind the rabbet locks the retainer plate 22 against release by bending of the rabbet or by movement by the latch element 26 to pivot the plate 32.

To open the door 18 normally, the lock handle 24 is pivoted about the axis of pin 25 to engage cam 54. Cam 54 pivots into the plane of the paper as seen in FIG. 4 to in turn pivot the element 50 against the bias of spring 27 and withdraw the latch element 26 from behind the keeper 28.

As the latch element 26 travels to the right as seen in FIG. 4, it engages arm 40 to pivot the plate 32 against the bias of spring 52 and withdraw the detent 42, from passage 44, as best seen in FIGS. 10 and 11. The door may now be simply pivoted to an open position. As will be appreciated the door may be closed in a manner similar to that explained for opening.

The foregoing is a description of an improved panelboard door lock assembly, whose inventive concepts are believed set forth in the accompanying claims.

What we claim is:

1. An improved vent assembly for an enclosure including a door to enclose a circuit interrupting device and carrying a lock assembly with a latch movable relative said assembly to engage behind a keeper on a door frame having a passage therein the improvement comprising:

a retainer plate having a detent thereon,
means supporting said plate on said door for pivotal movement relative said lock assembly,
means biasing said plate and detent in one direction and toward said frame for moving said detent into said passage in response to said door moving into a closed position for thereafter engaging an edge of said frame in response to a partial opening of said door under pressure of arc gases generated by a circuit interrupting device in said enclosure, and means on said plate engaged by said latch in response to a movement of said latch in a selected direction relative said assembly for moving said detent from said passage to enable a full opening of said door.

2. The vent assembly claimed in claim 1 in which said latch is movable parallel to the general plane of said door, and said means engaged by said latch includes an arm engaged by said latch in response to movement of said latch in a direction from said keeper.

3. The vent assembly claimed in claim 1, in which said means supporting said plate on said door comprises a post mounting said lock assembly on said door adjacent one edge of said door, and a first passage in said plate receiving said post to pivotally support said plate on said post.

4. In the vent assembly claimed in claim 3, a bend on one end of said plate, and a passage in said bend aligned with said first passage to pivotally support said plate at a second position.

5. The assembly claimed in claim 1 in which said frame includes a planar portion parallel to said door in the closed position and a rabbet extending transversely to said door in said closed position, and said keeper includes a tang formed from said planar portion and said passage is larger than said detent and located in said rabbet.

6. In the assembly aligned in claim 1 a lip on said detent extending parallel to said rabbet in response to the receipt of said detent in said passage for engagement with a surface of said rabbet opposite said lock assembly in response to the movement of said door from a closed to an open position under the influence of arc gases generated by said circuit interrupting device.

7. The assembly claimed in claim 1 in which said detent engages said edge with said door opened less than 60°.

8. An improved vent assembly for an enclosure including a generally planar door pivotally supported on said enclosure adjacent one edge of said door to move another edge of said door to a closed position adjacent a door frame and movable to an open position to enable access to a circuit interrupting device in said enclosure, said device generating arc gases exerting pressure on said door for moving said door from said closed position to said open position in response to a fault current passing through said device, the improvement comprising:

a latch carried by said door for engaging said frame to hold said door in said closed position, a member having a detent, means for pivotally supporting said member and detent on said door for pivoting movement in a plane parallel to the plane of said door, means for biasing said detent in a direction for engaging said frame upon partial opening of said door to prevent said door from moving to said open position in response to the pressure of said arc gases, means for manually moving said latch to disengage said latch from said frame, and means engaged by said moved latch for pivoting said detent from engagement with said frame to enable said door to be moved to said open position.

9. The vent assembly claimed in claim 8 in which said latch includes a housing and said means biasing said detent comprises a spring having one end engaged with said member and another end engaged with said housing.

10. An improved vent assembly for an enclosure including a frame for a door pivotally supported on said enclosure adjacent one edge of said door to move another edge of said door to a closed position adjacent said door frame and movable to an open position to enable access to a circuit interrupting device in said enclosure, said device generating arc gases exerting pressure on said door for moving said door from said closed position to said open position in response to a fault current passing through said device, the improvement comprising a passage in said door frame, a detent carried by said door, means for automatically moving said detent in one direction in a plane parallel to said door to move a portion of said detent into said passage in response to the movement of said door to a closed position, and means integrally formed on said detent extending transverse to said plane for engaging an edge portion of said passage in response to movement of said door toward an open position in response to the pressure of said gases for holding said door partially closed irrespective of warpage of said door to vent said gases.

* * * * *